US009466117B2

(12) United States Patent
Habets et al.

(10) Patent No.: US 9,466,117 B2
(45) Date of Patent: Oct. 11, 2016

(54) SEGMENTATION HIGHLIGHTER

(71) Applicant: KONINKLIJKE PHILIPS N.V., Eindhoven (NL)

(72) Inventors: Raymond Joseph Elisabeth Habets, Eindhoven (NL); Jeroen Jozef Sonnemans, Herten (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/402,928

(22) PCT Filed: May 21, 2013

(86) PCT No.: PCT/IB2013/054163
§ 371 (c)(1),
(2) Date: Nov. 21, 2014

(87) PCT Pub. No.: WO2013/179180
PCT Pub. Date: Dec. 5, 2013

(65) Prior Publication Data
US 2015/0110375 A1    Apr. 23, 2015

Related U.S. Application Data

(60) Provisional application No. 61/654,115, filed on Jun. 1, 2012.

(51) Int. Cl.
*G06K 9/00*      (2006.01)
*G06T 7/00*      (2006.01)
(Continued)

(52) U.S. Cl.
CPC ........... *G06T 7/0081* (2013.01); *G06T 7/0089* (2013.01); *G06T 15/00* (2013.01); *G06T 15/08* (2013.01); *G06T 19/20* (2013.01); *G06T 2200/24* (2013.01); *G06T 2207/10072* (2013.01); *G06T 2207/20092* (2013.01); *G06T 2207/30028* (2013.01); *G06T 2207/30101* (2013.01); *G06T 2210/41* (2013.01); *G06T 2219/2012* (2013.01)

(58) Field of Classification Search
CPC .............. G06T 7/0081; G06T 7/0089; G06T 2200/24; G06T 2207/10072; G06T 2207/20092; G06T 15/00; G06T 2207/30101; G06T 15/08; G06T 19/20; G06T 2210/41; G06T 2219/2012; G06T 2207/30028
USPC .......................................................... 382/131
See application file for complete search history.

(56) References Cited

U.S. PATENT DOCUMENTS 6,083,162 A  *  7/2000  Vining ......................... 600/407
7,349,569 B2 *  3/2008  Wiemker et al. ............. 382/154
(Continued)

OTHER PUBLICATIONS

Armstrong, C.J. et al. "Interactive Segmentation of Image Volumes with Live Surface", Computers & Graphics, vol. 31, Issue 2, Apr. 2007, pp. 212-229.
(Continued)

*Primary Examiner* — Gregory F Cunningham

(57) ABSTRACT

A method includes segmenting a region of interest in imaging data in a visual presentation of the imaging data and visually highlighting, concurrently with the segmenting, the region of interest while the region of interest is being segmented, wherein the visual highlighting includes coloring the region of interest while the region of interest is being segmented. A computer readable storage medium encoded with computer readable instructions, which, when executed by a processer, causes the processor to: segment a region of interest in imaging data in a visual presentation of the imaging data and visually highlight, concurrently with the segmenting, the region of interest while the region of interest is being segmented, wherein the visual highlighting includes coloring the region of interest while the region of interest is being segmented.

21 Claims, 3 Drawing Sheets

(51) Int. Cl.
*G06T 15/08* (2011.01)
*G06T 19/20* (2011.01)
*G06T 15/00* (2011.01)

(56) References Cited

U.S. PATENT DOCUMENTS

| | | | |
|---|---|---|---|
| 7,676,257 B2* | 3/2010 | Suryanarayanan et al. | 600/425 |
| 2005/0110791 A1* | 5/2005 | Krishnamoorthy | G06T 7/0083 345/419 |
| 2008/0122842 A1 | 5/2008 | Sirohey et al. | |
| 2008/0155627 A1* | 6/2008 | O'Connor et al. | 725/109 |
| 2010/0177177 A1* | 7/2010 | Sonnemans et al. | 348/61 |
| 2010/0195893 A1 | 8/2010 | Fuchigami et al. | |
| 2012/0011457 A1* | 1/2012 | Habets et al. | 715/769 |

OTHER PUBLICATIONS

Reese, J. et al. "Image Editing with Intelligent Paint". Eurographics UK Conference, 2002 Proceedings, the 20th, Institute of Electrical and Electronics Engineers (IEEE), 2002.

Mledical Image Processing Analysis & Visualization, "Segmenting Images Using Contours and Masks", pp. 1-23.

Main Windows. pp. 1-3. http://docs.gimp.org/2.6/en/gimp-concepts-main-windows.html.

* cited by examiner

SEGMENTATION HIGHLIGHTER

CROSS-REFERENCE TO PRIOR APPLICATIONS

This application is the U.S. National Phase application under 35 U.S.C. §371 of International Application No. PCT/IB2013/054163, filed on May 21, 2013, which claims the benefit of U.S. Provisional Application No. 61/654,115, filed on Jun. 1, 2012. This application is hereby incorporated by reference herein.

The following generally relates to segmenting a region of interest (e.g., a tubular structure such as a vessel, the colon, the bronchi, and/or other tubular structure and/or non-tubular structure) in imaging data and more particularly to highlighting (e.g., coloring) the region of interest in a visual presentation as the region of interest is being segmented from the imaging data in a visual presentation.

Three-dimensional (3D) visualization of imaging data allows for visually presenting a structure of interest (e.g., one or more vascular lesions) segmented from imaging data in its anatomical context (e.g., a brain lesion in the context of the skull). However, creating 3D visualizations using segmentations can be time and effort intensive. For example, existing segmentation techniques often process the entire dataset, which can be computationally expensive.

Furthermore, automatic segmentation algorithms often are embedded into the workflow of clinical application software and generally serve specific goals, for example, to segment or extract a centerline from a tubular structure represented in imaging data. Furthermore, reusing such segmentations to create visualizations often requires a lot of editing and using other tools (e.g., region of interest tools and merge tools). Such editing has been performed by placing additional (exclude or include) seed points and/or using cutting or spray-can tools.

3D visualizations approaches for vessels include visually presenting a 3D volume rendering of the dataset where bone has been removed and segmenting the vascular tree and then rendering the background as semi-transparent (e.g., x-ray or glass like view) and the vessels as a solid shaded volume rendering (SVR). To focus on a certain part of the vessel anatomy, the user has to edit the segmentations or combine the segmentations results with region of interest tools to mask the visible part of the segmentation.

Bone algorithms have the disadvantage that small vessels near the bones are sometimes removed as well. Furthermore, removing bone removes the anatomical context. Furthermore, vessel segmentation strategies are often less robust and they often fail near the interesting locations so many manual interactions are needed to edit and extend the segmentation. Moreover, the resulting visualization is only seen after the segmentation is finished, and thus to make changes to the visualization, the segmentation has to be performed again.

Aspects described herein address the above-referenced problems and others.

In one aspect, a method includes segmenting a region of interest in imaging data in a visual presentation of the imaging data and visually highlighting, concurrently with the segmenting, the region of interest while the region of interest is being segmented. The visual highlighting includes coloring the region of interest while the region of interest is being segmented.

In another aspect, a computer readable storage medium encoded with computer readable instructions, which, when executed by a processor, causes the processor to: segment a region of interest in imaging data in a visual presentation of the imaging data and visually highlight, concurrently with the segmenting, the region of interest while the region of interest is being segmented, wherein the visual highlighting includes coloring the region of interest while the region of interest is being segmented.

In another aspect, a computer readable storage medium includes computer executable instructions for concurrently segmenting and highlighting a region of interest in visually presented imaging data. A processor executes the computer executable instructions, wherein the processor, when executing the computer executable instructions, segments a region of interest in imaging data in a visual presentation of the imaging data and visually highlights, concurrently with the segmenting, the region of interest while the region of interest is being segmented, wherein the visual highlighting includes coloring the region of interest while the region of interest is being segmented.

The invention may take form in various components and arrangements of components, and in various steps and arrangements of steps. The drawings are only for purposes of illustrating the preferred embodiments and are not to be construed as limiting the invention.

FIG. 1 schematically illustrates an example computing device with a segmentor, highlighter and highlight remover.

The following describes an approach in which a structure of interest being segmented in imaging data is visually highlighted and visually presented along with other structure in the imaging data during the segmentation of the structure of interest from the imaging data.

Figure 1:
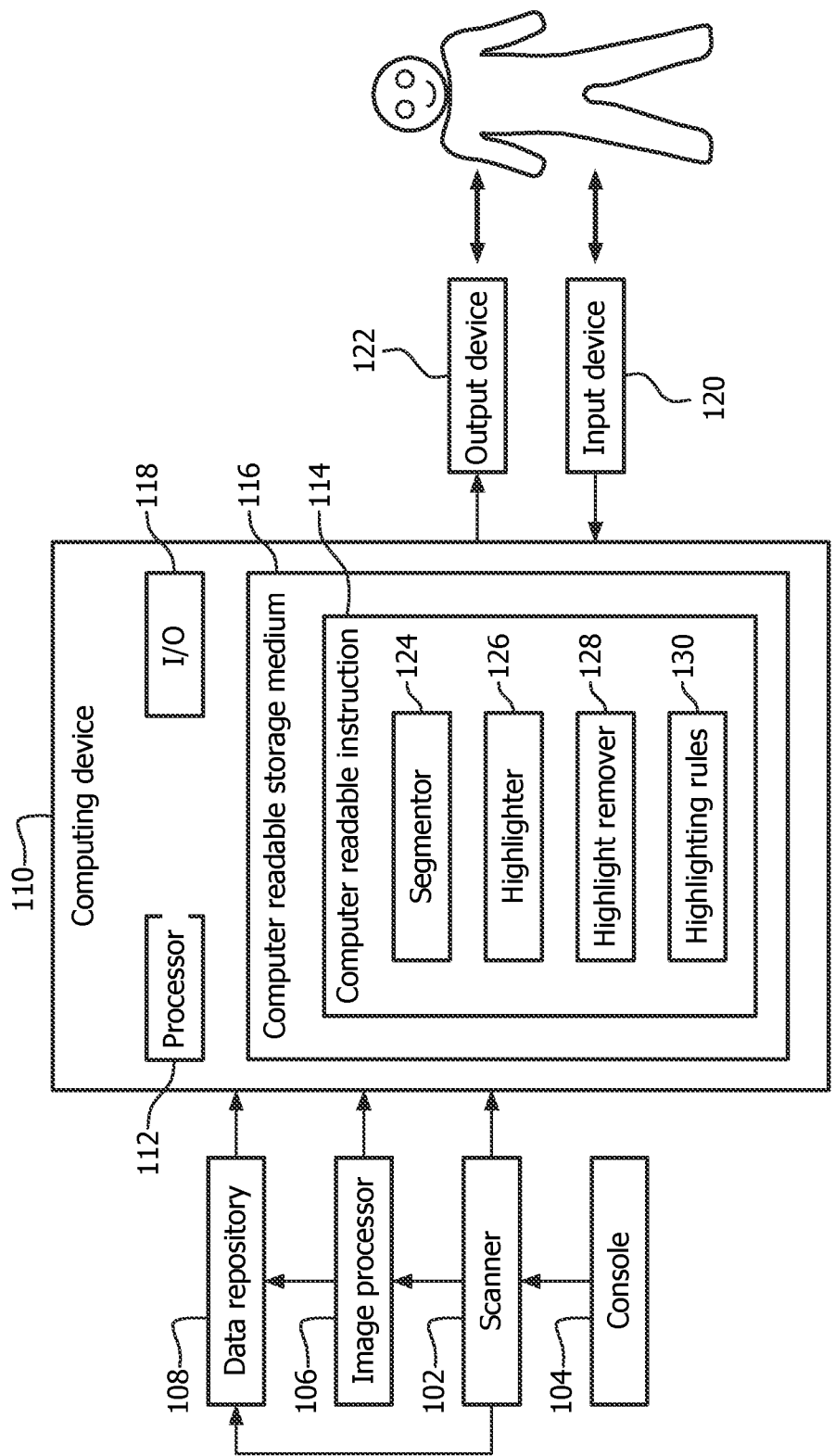

FIG. 1 depicts a scanner 102 such as a computed tomography (CT), magnetic resonance (MR), x-ray, or other imaging scanner.

A console 104 includes a general-purpose computing system with a human readable output device such as a monitor and an input device such as a keyboard, mouse, etc. Software resident on the console 104 allows an operator to interact with the scanner 102, including initiating scanning, etc.

An image processor 106 processes the output of the scanner 102 and generates imaging data (or images). The imaging data and/or the scanner output can be further processed and/or visually displayed.

A data repository 108 can be used to store the imaging data and/or scanner output. The data repository 108 can be part of local memory of the scanner 102 and/or one or more of a picture archiving and communication system (PACS), a radiology information system (RIS), a hospital information system (HIS), and/or other data storage device.

A computing device 110 processes the imaging data and/or the scanner output. The illustrated computing device 110 includes at least one processor 112 that executes at least one computer readable instruction 114 stored in computer readable storage medium 116, such as physical memory or other non-transitory storage medium. Additionally or alternatively, the processor 112 executes one or more computer readable instructions carried by a carrier wave, a signal or other transitory medium.

The computing device 110 further includes input/output (I/O) 118, which is configured to receive information (e.g., an activate segmentation highlight/removal feature signal)

from one or more input devices 120 (e.g., a keyboard, a mouse, etc.) and/or convey information (e.g., a highlighted segmentation, etc.) to one or more output devices 122 (e.g., a monitor, a filmer, portable memory, etc.). The illustrated at least one computer readable instruction 114 at least includes instructions for implementing a segmentor 124.

The segmentor 124 can be implemented via known segmenting approaches. An example of a suitable segmentor is discussed in U.S. patent application Ser. No. 12/602,923, entitled "INSPECTION OF TUBULAR-SHAPED STRUCTURES," and filed on Jul. 15, 2010, which is incorporated by reference in its entirety herein. Another example of a suitable segmentor is discussed in U.S. patent application Ser. No. 13/257,682, entitled "VISUALIZING A VIEW OF A SCENE," and filed on Jan. 12, 2012, which is incorporated by reference in its entirety herein. Other segmenting approaches are also contemplated herein.

The illustrated at least one computer readable instruction 114 also includes instructions for implementing a segmentor highlighter 126 and a segmentor highlight remover 128 and highlighting rules 130. As described in greater detail below, the highlighter 126, when activated, visually highlights a portion of a segmented region of interest as the portions region of interest is being segmented from imaging data, the highlight remover 128, when activated, removes previous highlighting from portions of the segmented region of interest, and the highlighting rules 130 determine highlighting characteristics such as color, tone, texture, etc.

In one instance, visual highlighting is performed using the segmentor as the segmentor identifies the voxels which will be highlighted. Non-segmented regions can be shown as a semi-transparent glass or other semi-transparent rendering, which provides anatomical context. The above allows creating visualizations as a primary task as the visualization is created concurrently with segmenting and provides a user with direct, intuitive and fast interaction to segment and selectively highlight and/or remove highlighting from structure therein. Highlighting can be tailored to specific structure (e.g., plaque, lumen wall, an aneurism, etc.), and can be performed in connection with measurements and/or other known segmentation tasks.

Figure 2:
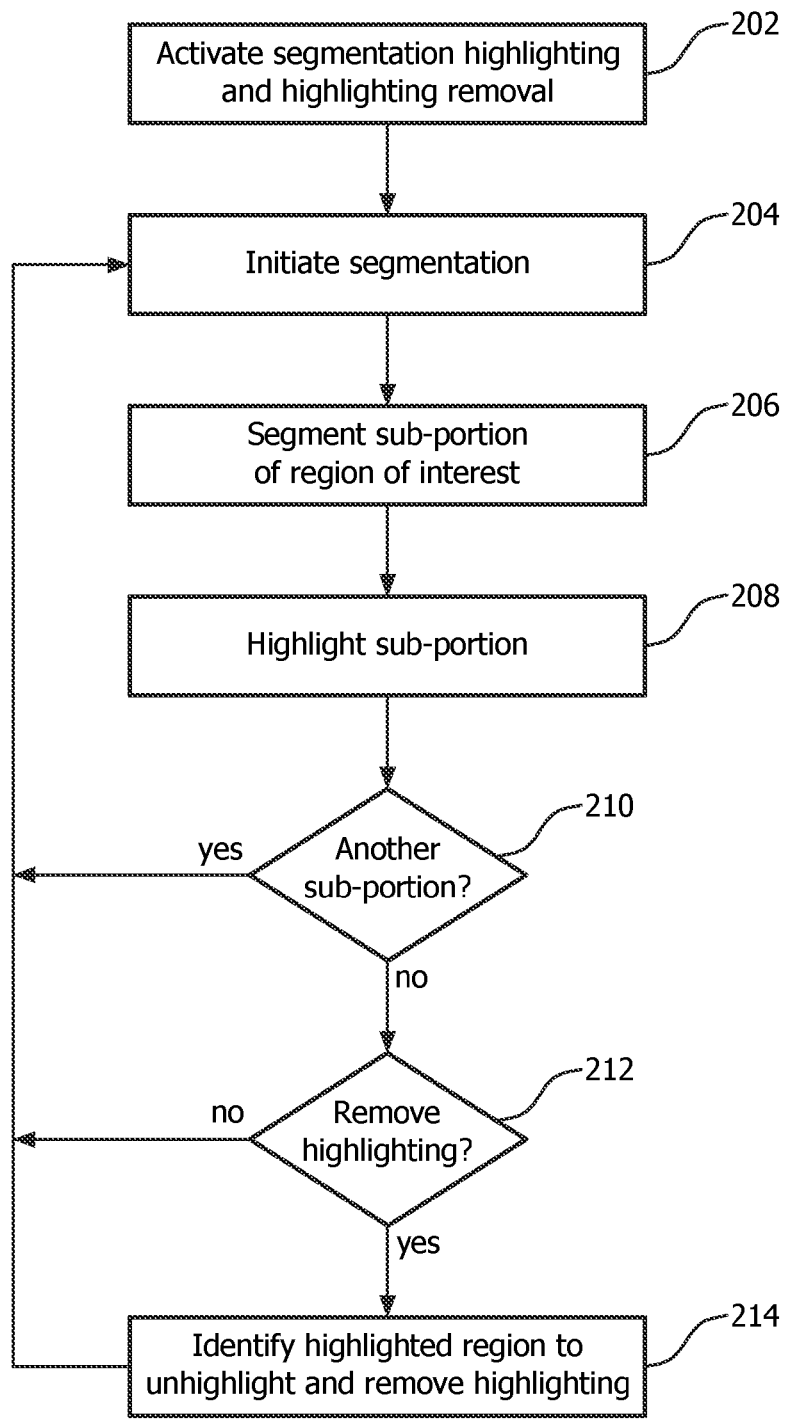
FIG. 2 illustrates an example method for concurrently segmenting and highlighting a region of interest.

FIG. 2 illustrates an example method for concurrently segmenting and highlighting a region of interest.

It is to be appreciated that the ordering of the acts in the methods described herein is not limiting. As such, other orderings are contemplated herein. In addition, one or more acts may be omitted and/or one or more additional acts may be included.

At 202, segmentation highlighting and highlighting removal is activated. This can be achieved through a default and/or a user defined configuration loaded upon launching a segmentation computer application, and/or user selection via the input device 120 and a graphical user interface (GUI), for example, selecting a visual graphic in menu of the GUI.

At 204, segmentation is initiated. Suitable segmentation may include automatic segmentation based on a user identified seed point, voxel value, etc, using known or other segmentation approaches, manual segmentation by a user, etc.

At 206, a sub-portion of the region of interest is segmented.

At 208, concurrently with act 206, a surface of the segmented sub-portion is highlighted. For explanatory purposes, in this example, the surface is highlighted with a color that is distinguishable and different from other visually presented data and the original color (e.g., a gray scale value) of the sub-portion. An example of selecting a particular highlighting is discussed in connection with FIG. 3 below.

At 210, it is determined whether another sub-portion is to be segmented. This decision can be based on whether a predetermined segmentation end point is reached a user select another end point which is not already part of the sub-portion, a user moves the segmentation tool in the visual presentation to another location along the structure of interest, and/or otherwise.

The subsequent sub-portion does not have to commence at the previous end point. For example, if the sub-portion is along a long axis a tubular structure such as a vessel, the next sub-portion can continue along the long axis, branch off the side of the tubular structure through a bifurcation, extend from the beginning of the sub-portion in an opposing direction, extend towards the sub-portion from a point not part of the segmentation, etc.

If another sub-portion is to be segmented, acts 204-210 are repeated. The different sub-portion can be connected or independent.

If another sub-portion is not to be segmented, at 212, it is determined whether any highlighting is to be removed. This may include simply moving over an already highlighted region, clicking on a region, using a geometric boundary tool to surround and identify the region, etc.

If highlighting is to be removed, at 214, highlighting to remove is identified and removed from the visual presentation, and acts 204-212 are repeated. Identification can be achieved similar to highlighting, but instead of highlighting the sub-portion, existing highlighting is removed.

If no highlighting is to be removed, 204-212 are repeated.

It is to be appreciated that the visual presentation may include rendering non-segmented regions in glass mode with the highlighted segmented regions displayed as a solid shaded volume rendering. In a variation, the segmentation highlighting can be performed in glass mode. It is to be appreciated that completed segmentation can be extended and/or reduced, and/or otherwise modified.

The above can be employed to segment a tubular structure such as a vessel, the colon, the trachea, the bronchi, and/or other tubular structure, and/or one or more non-tubular structures. Where a vessel is segmented, the imaging data visually presented in glass mode may include only bone or bone and other structure.

Figure 3:
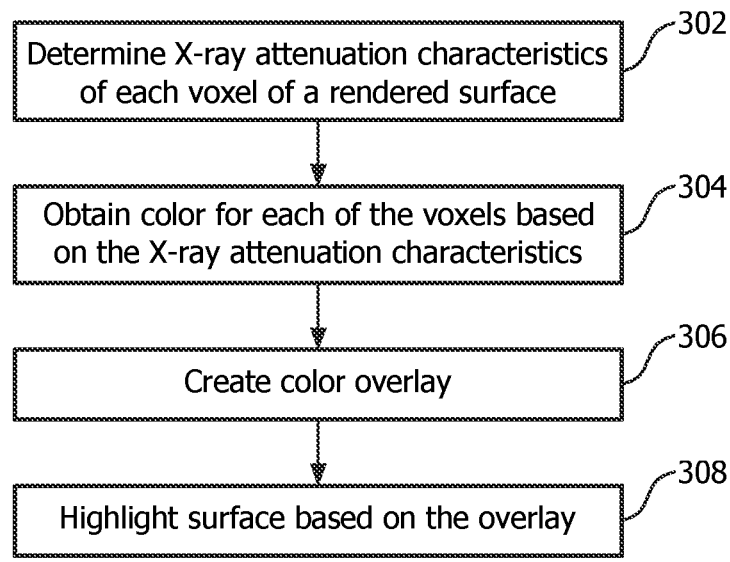
FIG. 3 illustrates an example method for highlighting the region of interest.

FIG. 3 illustrates an example method for highlighting the segmented region of interest in connection with act 208.

It is to be appreciated that the ordering of the acts in the methods described herein is not limiting. As such, other orderings are contemplated herein. In addition, one or more acts may be omitted and/or one or more additional acts may be included.

At 302, an x-ray attenuation characteristic is determined for each voxel of the segmented surface.

At 304, for each voxel, the highlighting rules 130 are accessed to obtain a color corresponding to the x-ray attenuation characteristic.

By way of example, with a vessel, the vessel lumen may be assigned one color while calcified plaque is assigned a different distinguishable color. In another example, a different color may be assigned to different vessel wall thicknesses, attenuation, etc.

At 306, a color overlay is created based on the obtained colors.

At 308, the surface is highlighted by superimposing the overlay over the rendering.

Figure 4:
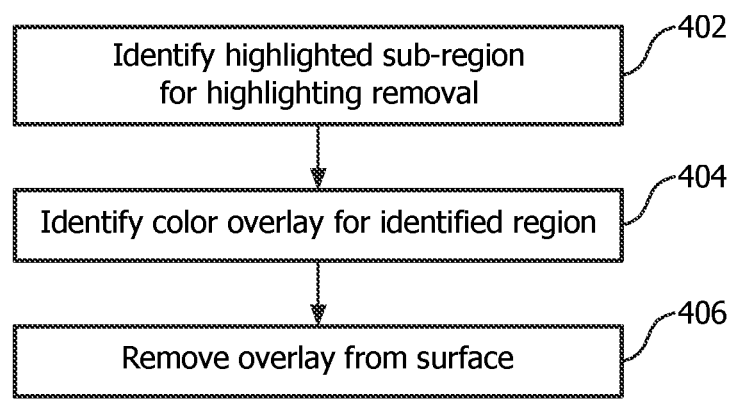
FIG. 4 illustrates an example method for removing highlighting of the region of interest.

FIG. 4 illustrates an example method for removing highlighting from the segmented region of interest in connection with act 214.

It is to be appreciated that the ordering of the acts in the methods described herein is not limiting. As such, other orderings are contemplated herein. In addition, one or more acts may be omitted and/or one or more additional acts may be included.

At 402, a sub-region of the highlighted segmentation is identified. As discussed herein, this can be achieved similar to highlighting a sub-portion to highlight.

At 404, the overlay for the highlighted sub-portion is identified.

At 406, the color of the overlay or the overlay is removed.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

In a variation, a length measurement style interaction is used to create a vessel segmentation object. For this, a start point is identified and an end point is identified, and the segmentation and highlighting are automatically performed from the start point to the end point. With vessel tracking, the segmentation can be based on a tracked path through the vessel. This can also be used to reduce part of the segmentation.

In another variation, several sub-segmentations are performed and combined. For example, a first sub-segmentation can be used to visually highlight a lumen. A second sub-segmentation can be used to highlight a vessel outer wall at selected locations. A third sub-segmentation can be used to highlight calcifications in a selected area. If 4D flow data is available, a fourth sub-segmentation can be used to highlight flow information on (or in) the vessel lumen. Also, in this case, the inverse operation can be used to erase parts of the segmentation.

In another variation, the highlighting can be dedicated to specific structure, for example, an aneurism. For this, a highlighted lumen contour is combined with a highlighted vessel wall contour. In one instance, both surfaces are visible in the visual presentation. Optionally, the segmentations can be used to initialize the meshes for the aneurism active shape models, which may result in a more accurate segmentation and also include more measurements (or simulations).

As discussed above, the segmentor 124 can be the segmentor discussed in U.S. patent application Ser. Nos. 12/602,923 and/or 13/257,682, Generally, the ring segmentor described therein 'tracks' along a vessel and determines a cross section of the vessel, and then segments lumen (the interior of the vessel), outer wall, calcifications, wall thickness, plaque, and/or other information, for example, based on different tissue properties such as imaging characteristics of the tissue, which depend on the type of scan (e.g., CT, MR, etc.). For example, with CT, the imaging property may be an x-ray attenuation characteristic (e.g., CT Hounsfield values) and/or other criteria. The highlighter 126 highlights a predetermined portion, user selected portion, or all of the segmented information, as described herein.

In another variation, the segmentations created as discussed above can be turned into a volume measurement. Measurements can be more comprehensive, for example, plaque burden can be measured while excluding calcification volumes.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
   segmenting a region of interest in imaging data in a visual presentation of the imaging data; and
   visually highlighting, concurrently with the segmenting, the region of interest while the region of interest is being segmented,
   wherein the visual highlighting includes coloring the region of interest while the region of interest is being segmented.

2. The method of claim 1, further comprising:
   rendering the highlighted portion as a solid shaded volume rendering.

3. The method of claim 2, wherein the region of interest is a tubular vessel of a scanned subject.

4. The method of claim 1, further comprising:
   rendering non-segmented portions of the imaging data in a semi-transparent glass view rendering.

5. The method of claim 4, wherein the non-highlighted portions are bone.

6. The method of claim 1, further comprising:
   extending the segmented region of interest, thereby extending the highlighting in the visual presentation, wherein the extending occurs at a point different from a beginning and different from an ending of the segmented region of interest.

7. The method of claim 1, further comprising:
   removing highlighting from a previously highlighted region of the visual presentation.

8. The method of claim 7, wherein removing the highlighting includes identifying a segment of the highlighted segmentation and removing the highlighting from the segment.

9. The method of claim 1, further comprising:
   determining an imaging characteristic of a segmented sub-portion, wherein at least two voxels of the segmented sub-portion have different imaging characteristics;
   identifying a different color for each of the different imaging characteristics; and
   highlighting the at least two voxels with the corresponding different colors.

10. The method of claim 1, wherein the region of interest is a vessel, and the segmenting the region of interest, comprising:
    tracking along the vessel; and
    determining a cross section of the vessel; and
    segmenting a lumen of the vessel based on an imaging characteristic of the lumen.

11. The method of claim 10, the visually highlighting, comprising:
    visually highlighting the segmented lumen.

12. The method of claim 10, further comprising:
    segmenting one or more of an outer wall, a calcification, a wall thickness, or plaque of the vessel respectively based on an imaging characteristic of the outer wall, the calcification, the wall thickness, or the plaque.

13. The method of claim 12, the visually highlighting, comprising:

visually highlighting one or more of the segmented outer wall, calcification, wall thickness, or plaque.

14. A non-transitory computer readable storage medium encoded with computer readable instructions, which, when executed by a processer, causes the processor to:
  segment a region of interest in imaging data in a visual presentation of the imaging data; and
  visually highlight, concurrently with the segmenting, the region of interest while the region of interest is being segmented,
  wherein the visual highlighting includes coloring the region of interest while the region of interest is being segmented.

15. The method of claim 1, wherein the region of interest is a tubular vessel of a scanned subject and the segmenting and visually highlighting further comprises:
  identifying a first voxel as being part of the region of interest;
  segmenting and concurrently visually highlighting the first voxel of the region of interest, wherein the highlighting is distinguishable and different from other visually presented data and an original color of the first voxel;
  identifying, after the segmenting and concurrently visually highlighting of the first voxel, a second voxel as being part of the region of interest; and
  segmenting and concurrently visually highlighting the second voxel of the region of interest, wherein the highlighting is distinguishable and different from other visually presented data and an original color of the second voxel.

16. The method of claim 15, further comprising:
  determining an entirety of the region of interest has not been segmented; and
  in response to determining the entirety of the region of interest has not been segmented,
    identifying a third voxel as being part of the region of interest; and
    segmenting and concurrently visually highlighting the third voxel of the region of interest, wherein the highlighting is distinguishable and different from other visually presented data and an original color of the third voxel.

17. The method of claim 16, further comprising:
removing the highlighting from only one or two of the first, the second or the third voxels.

18. The method of claim 16, wherein the first, the second and the third voxels are contiguous voxels.

19. The method of claim 16, wherein the first, the second and the third voxels are non-contiguous voxels.

20. The method of claim 16, further comprising:
determining the entirety of the region of interest is segmented; and
extending the region of interest by:
  identifying a fourth voxel; and
  segmenting and concurrently visually highlighting the fourth, wherein the highlighting is distinguishable and different from other visually presented data and an original color of the fourth voxel.

21. The method of claim 16, further comprising:
determining the entirety of the region of interest is segmented; and
reducing the region of interest by removing one of the first, the second and the third voxels from the region of interest.

* * * * *